(12) United States Patent
Moran et al.

(10) Patent No.: US 10,091,332 B2
(45) Date of Patent: Oct. 2, 2018

(54) MOBILE CLOUD PROXY APPARATUS AND METHOD

(71) Applicant: Intel Corporation, Santa Clara, CA (US)

(72) Inventors: Michael T. Moran, Naas (IE); Stephen C. Chadwick, Chandler, AZ (US); Tobias M. Kohlenberg, Portland, OR (US); Charles Baron, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 134 days.

(21) Appl. No.: 14/582,158

(22) Filed: Dec. 23, 2014

(65) Prior Publication Data

US 2016/0182685 A1   Jun. 23, 2016

(51) Int. Cl.
| | | |
|---|---|---|
| *H04L 29/06* | (2006.01) | |
| *H04L 29/08* | (2006.01) | |
| *H04W 4/021* | (2018.01) | |
| *H04W 4/18* | (2009.01) | |
| *H04W 12/00* | (2009.01) | |
| *H04W 12/08* | (2009.01) | |
| *G06F 21/62* | (2013.01) | |

(52) U.S. Cl.
CPC .......... *H04L 67/42* (2013.01); *G06F 21/6218* (2013.01); *H04L 63/20* (2013.01); *H04L 67/28* (2013.01); *H04W 4/021* (2013.01); *H04W 4/18* (2013.01); *H04W 12/00* (2013.01); *H04W 12/08* (2013.01); *G06F 2221/2111* (2013.01)

(58) Field of Classification Search
CPC ................................ H04L 67/42; H04L 67/28
USPC ......................................................... 709/203
See application file for complete search history.

(56) References Cited

U.S. PATENT DOCUMENTS

2012/0317166 A1* 12/2012 Schleifer ............. H04L 67/2814
                                                              709/202
2013/0097281 A1   4/2013 Boudreau et al.
(Continued)

FOREIGN PATENT DOCUMENTS

WO   WO2014-193081 A1   12/2014

OTHER PUBLICATIONS

International Search Report and Written Opinion dated Feb. 11, 2016 for International Application No. PCT/US2015/060012, 15 pages.
(Continued)

*Primary Examiner* — Suraj Joshi
(74) *Attorney, Agent, or Firm* — Schwabe, Williamson & Wyatt, P.C.

(57) ABSTRACT

Apparatuses, methods and storage medium associated with providing mobile cloud proxy service to mobile client devices are disclosed. In embodiments, a mobile cloud proxy device may include a cloud proxy server to provide the cloud proxy service to the mobile client devices while the mobile client devices are within a mobile cloud proxy service area serviced by the cloud proxy server. The cloud proxy server may include a device and service area management module to manage the mobile cloud proxy service area and the one or more mobile client devices, and a policy and service management module to manage and provide the mobile cloud proxy service in accordance with one or more cloud proxy service policies. Other embodiments may be disclosed and/or claimed.

23 Claims, 8 Drawing Sheets

(56) References Cited

U.S. PATENT DOCUMENTS

| | | | |
|---|---|---|---|
| 2013/0145010 A1* | 6/2013 | Luna | H04W 40/248 |
| | | | 709/223 |
| 2013/0221094 A1* | 8/2013 | Smith | G07C 9/00309 |
| | | | 235/382 |
| 2013/0226812 A1 | 8/2013 | Landrok et al. | |
| 2014/0153481 A1* | 6/2014 | Draznin | H04W 24/04 |
| | | | 370/328 |
| 2014/0162692 A1* | 6/2014 | Li | H04L 67/40 |
| | | | 455/456.3 |
| 2015/0222576 A1* | 8/2015 | Anderson | G06F 9/4443 |
| | | | 715/752 |

OTHER PUBLICATIONS

International Preliminary Report on Patentability dated Jul. 6, 2017 for International Application No. PCT/US2015/060012, 12 pages.
Extended European Search Report dated Jul. 2, 2018 for European Patent Application No. 15873907.8, 12 pages.
Kyocera, "Resource allocation schemes for 1 D2D communication", 3GPP Draft; R2-134311 D2D Architecture, 3rd Genreation Partnership Project (3GPP), Mobile Competence Centre; 650, Route Des Lucioles; F-06921 Sophia-Antipolis Cedex; France, vol. RAN WG2, no. San Francisco, USA Nov. 11-15, 2013, 12 pages.

* cited by examiner

MOBILE CLOUD PROXY APPARATUS AND METHOD

TECHNICAL FIELD

The present disclosure relates to the field of data processing. More particularly, the present disclosure relates to providing mobile cloud proxy service to mobile client devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Cloud computing is computing in which large groups of remote servers are networked to allow centralized data storage and online access to computer services or resources. Clouds can be classified as public, private or hybrid. With advances in computing, networking and related technologies cloud computing has become increasingly popular.

With the increased popularity of cloud computing, there have been increased concerns with security. As a result, numerous enterprise products which supplement and improve the security of cloud solutions have been developed. However, while these same concerns exist for consumer space no equivalent solutions have been developed. As a result, some consumers prefer not to use cloud services, while others use custom developed or open source, which tend to be difficult to use. Still other solution requires the use of a third party, which is not totally satisfactory, as it requires the consumers to trust the third party.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
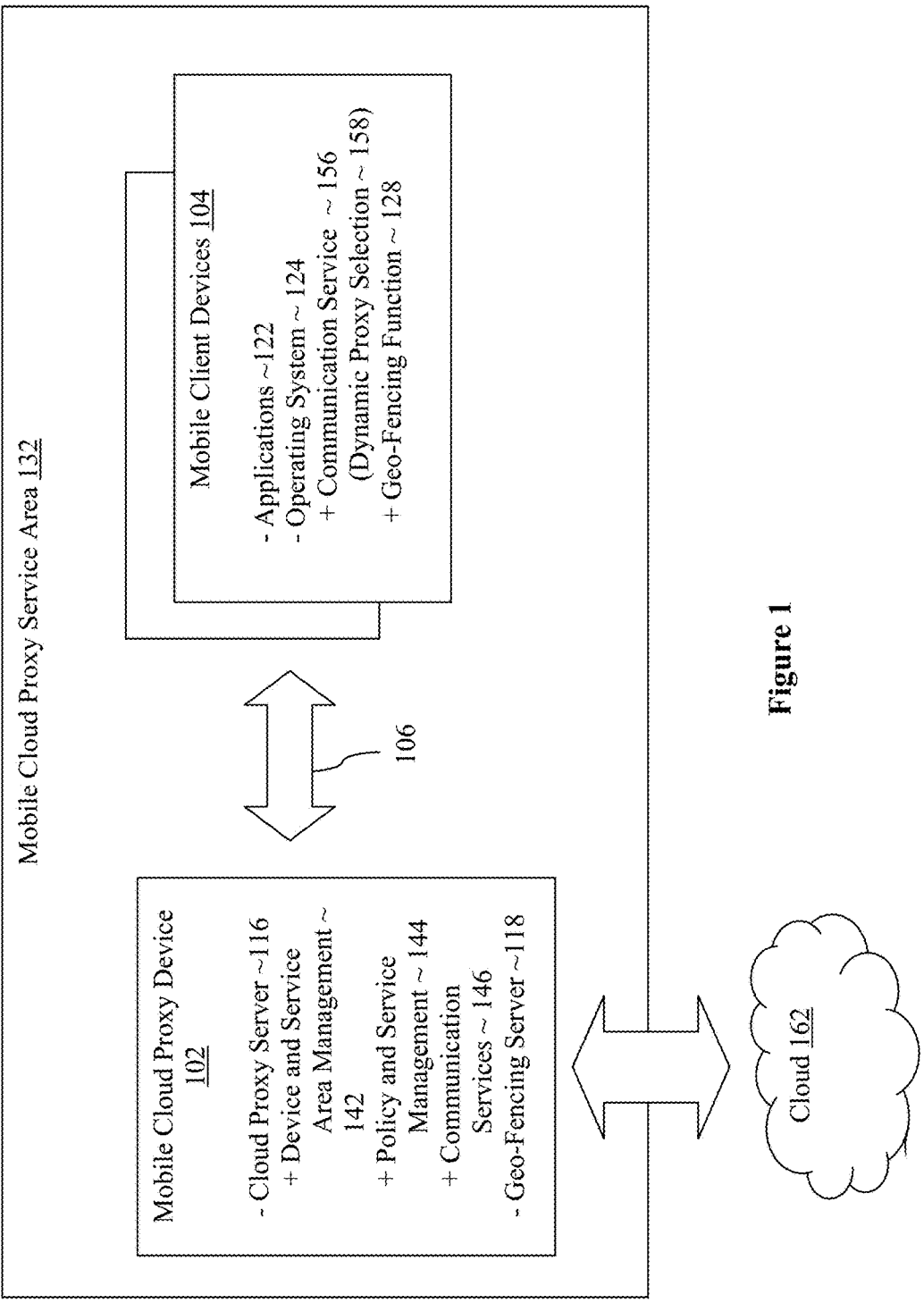
FIG. 1 illustrates an example operating environment incorporated with mobile cloud proxy teachings of the present disclosure, according to the disclosed embodiments.

Apparatuses, methods and storage medium associated with providing mobile cloud proxy service to mobile client devices are disclosed. In embodiments, a mobile cloud proxy device may include a cloud proxy server to provide the cloud proxy service to the mobile client devices while the mobile client devices are within a mobile cloud proxy service area serviced by the cloud proxy server. The mobile cloud proxy service area may e.g., be a local area immediately around the mobile cloud proxy device that moves with the mobile cloud proxy device. In embodiments, the cloud proxy server may include a device and service area management module to manage the mobile cloud proxy service area and the one or more mobile client devices, and a policy and service management module to manage and provide the mobile cloud proxy service in accordance with one or more cloud proxy service policies, e.g., policies on encryption, delay routing, filtering, and so forth.

In embodiments, a mobile client device may include a dynamic proxy selection service, to select a mobile cloud proxy device to provide cloud proxy service to the mobile client device. The selection may be made in response to a determination that the mobile client device is within the mobile cloud proxy service area serviced by the mobile cloud proxy device. On selection and establishment of a proxy relationship, all communications of the mobile client device with the cloud may be funneled through the mobile cloud proxy device, according to various policies of the mobile cloud proxy device.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an example operating environment incorporated with the mobile cloud proxy teachings of the present disclosure, in accordance with various embodiments, is shown. As illustrated, in embodiments, operating environment 100 may include a mobile cloud proxy device 102 and one or more mobile client devices 104 communicatively coupled with each other via one or more communication links 106. Mobile cloud proxy device 102 may include cloud proxy server 116 configured to provide cloud proxy service for mobile client devices 104 to access cloud services in cloud 162, while mobile client devices 104 are within the mobile cloud proxy device's service area 132. Mobile client devices 104 may each include one or more applications 122 and operating system 124 having communication service 156 that includes a dynamic proxy selection function 158 configured to dynamically select mobile cloud proxy device 102 to provide cloud proxy service to mobile client devices 104, while mobile client devices 104 are within the mobile cloud proxy device's service area 132.

In embodiments, mobile cloud proxy device 102 may be a wearable device, e.g., integrated with a wrist band, a waist band, a head band, and so forth. Cloud services in cloud 162 may include a wide range of cloud services known in the art, including, but are not limited to, storage services, content services, social networking services, and so forth. Except for the teachings of the present disclosure, mobile client devices 104 may be a wide range of mobile devices known in the art, include but are not limited to, smartphones, cameras, computing tablets, ultrabooks, ebooks, laptops, portable gaming devices, and so forth.

In embodiments, cloud proxy server 116 may include device and service area management module/function 142, policy and service management module/function 144 and communication services 146. Device and service area management module/function 142 may be configured to manage mobile cloud proxy service area 132, e.g., its size, which may vary depending on a current location of mobile cloud proxy device 102. For example, mobile cloud proxy service area 132 may be of a first larger size when the current location of mobile cloud proxy device 102 is home, a second intermediate size when the current location of mobile cloud proxy device 102 is at a relatively sparsely populated public venue, such as, the beach, a third smaller size when the current location of mobile cloud proxy device 102 is at a relatively densely populated public venue, such as a small crowded coffee shop, and so forth. Additionally, device and service area management module/function 142 may further be configured to manage mobile client devices 104 it services, e.g., registration of mobile client devices 104, detection of presence of mobile client devices 104 within its service area 132, including authentication of the mobile client devices 104.

Additionally, cloud proxy server 116 may include policy and service management module/function 144 configured to manage and provide the mobile cloud proxy service in accordance with one or more cloud proxy service policies. Examples of these policies may include, but are not limited to, storage policies that govern where certain data files are to be stored in cloud 162, encryption policies that govern whether upstream data traffic to cloud 162 are to be encrypted before transmitted upstream (and how), filtering/deferred routing policies that govern whether upstream or downstream data traffic to cloud 162 are to be filtered or delayed until a later point in time (such as, until users of mobile client devices 104 return home from current travel), and so forth.

Further, cloud proxy server 116 may include communication services 146 configured to provide various communication services with mobile client devices 104 and cloud 162. Examples of communication services with mobile client devices 104 (i.e. communication links 106) may include, but are not limited to WiFi, Bluetooth®, Near Field Communication (NFC), and so forth. Examples of communication services with cloud 162 may include Transmission Control Protocol/Internet Protocol (TCP/IP), 3G/4G/5G, WiFi, and so forth.

In embodiments, mobile cloud proxy device 102 may further include geo-fencing server 118 configured to provide geo-fencing services. For these embodiments, device and service area manage module/function 142 may leverage on the geo-fencing services provided by geo-fencing server 118 in managing its service area 132, and detecting presence of mobile client devices 104 in service area 132.

Still referring to FIG. 1, as earlier described, mobile client device 104 may each include one or more applications 122 and operating system 124 having communication service 156 that includes a dynamic proxy selection function 158 configured to dynamically select mobile cloud proxy device 102 to provide cloud proxy service to mobile client devices 104, while mobile client devices 104 are within the mobile cloud proxy device's service area 132. Applications 122 may be configured to provide one or more application services, which may be any one of a wide range of application services known in the art. Examples of application services may include, but are not limited to, browser services, search, map services, social networking, games, media consumption, and so forth. Similar to communication services 146, communication service 156, in general, may be configured to provide various communication services with mobile client devices 104 and cloud 162 (when mobile client devices 104 are not in service area 132 of mobile cloud proxy device 102 using its cloud proxy service). Thus, likewise, examples of communication services with mobile cloud proxy device 102 (i.e. communication links 106) may include, but are not limited to WiFi, Bluetooth®, Near Field Communication (NFC), and so forth. Examples of communication services with cloud 162 may include Transmission Control Protocol/Internet Protocol (TCP/IP), 3G/4G/5G, WiFi, and so forth. Except for dynamic selection of the mobile cloud proxy service of mobile cloud proxy device 102 (to be described in more detail below), dynamic proxy selection function 158 may be otherwise a wide range of dynamic proxy selection services known in the art.

In embodiments, as shown, operating system 124 of at least some of the mobile client devices 104 may each include geo-fencing function 128 configured to provide geo-fencing services. For these embodiments, dynamic proxy selection function 158 may leverage on the geo-fencing services provided by geo-fencing function 128 to dynamically determine that a mobile client device 104 is within service area 132 of mobile cloud proxy device 102, and select mobile cloud proxy device 102 to provide mobile cloud proxy service to mobile client devices 104.

Figure 2:
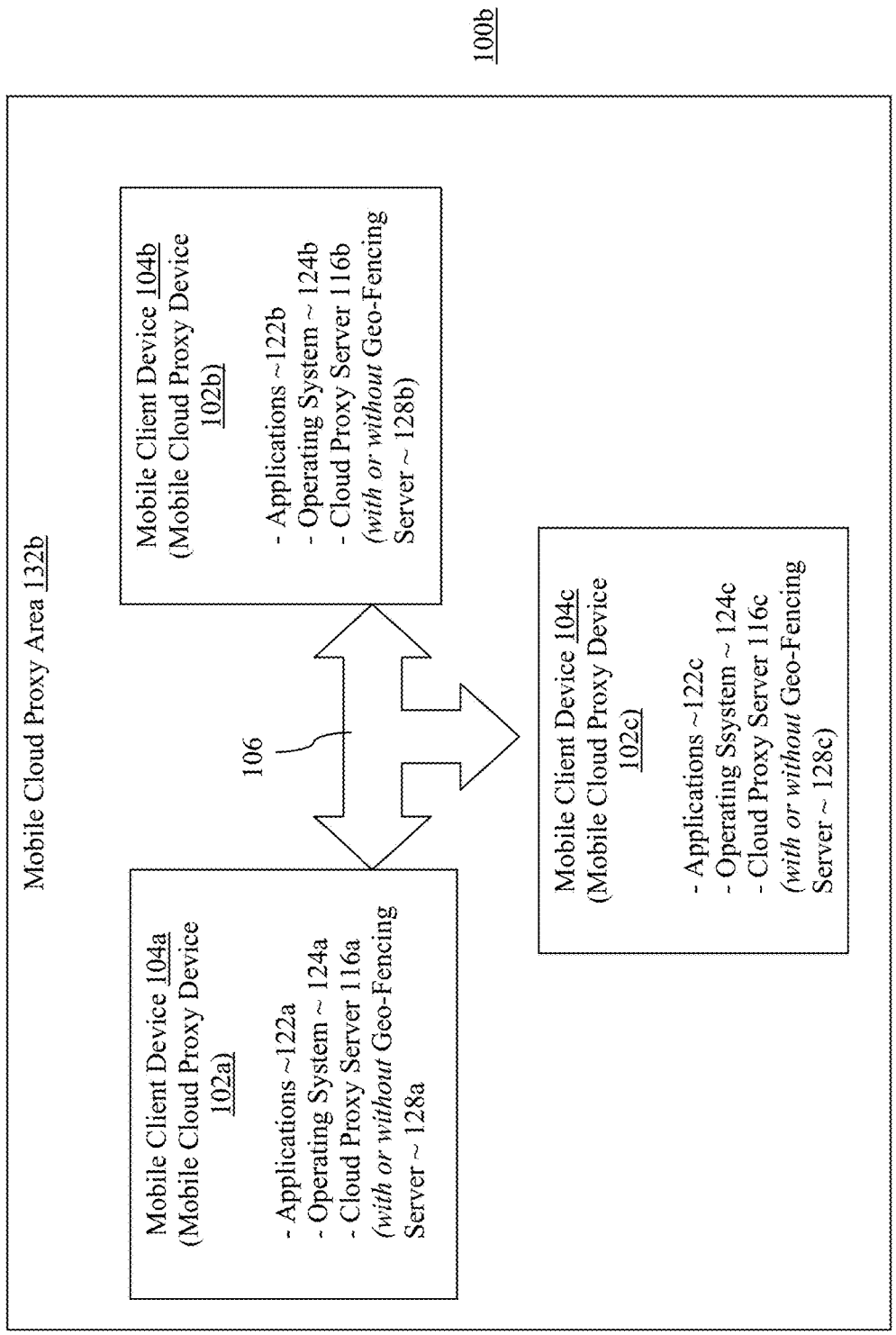
FIG. 2 illustrates one particular example operating environment of FIG. 1, according to the disclosed embodiments.

Still referring to FIG. 1, and additionally to FIG. 2, in embodiments, one or more mobile client devices 104a-104c, in addition to respectively having applications 122a-122c, and operating systems 124a-124c, may further be respectively configured with cloud proxy servers 116a-116c (with or without geo-fencing servers 128a-128c), to enable the one or more mobile client devices 104a-104c to serve as mobile cloud proxy devices 102a-102c. For these embodiments, as shown in FIG. 2, mobile client devices 104a-104c of operating environment 100b, more specifically, cloud proxy servers 116a-116c (with or without geo-fencing servers 128a-128c) of mobile cloud proxy devices 102a-102c may jointly and dynamically negotiate the definition of service area 132b, that is the operational proximity of mobile client devices 104a-104c within which mobile client devices 104a-104c are to be provided with proxy cloud services. An example of such service area 132b may include, but is not limited to, a temporal collaboration area (e.g., in a coffee shop) dynamically negotiated among mobile client devices 104a-104c of a group of co-workers (that can also serve as mobile cloud proxy device 102a-102c). In embodiments, the negotiation and selection of one of mobile cloud proxy servers 116a-116c to provide cloud proxy service to the other mobile client devices 104a-104c may be based at least in part on the respective battery life of mobile client devices 104a-104c.

While for ease of understanding, each mobile client device 104a, 104b and 104c is illustrated as having cloud proxy server 116a, 116b and 116c correspondingly, in practice, not all mobile client devices 104a-104c have to have cloud proxy server 116a-116c. The present disclosure may be practiced with only a subset of mobile client devices 104a-104c having cloud proxy server 116a-116c. For these embodiments, negotiation and selection of the cloud proxy server 116 may be conducted among those mobile client devices 104a-104c equipped with cloud proxy servers 116a-116c.

Further, it should be noted that while for ease of understanding, mobile cloud proxy device 102 has been (and will continue to be) described as configured to provide cloud proxy service to mobile client devices 104 within mobile cloud proxy device's service area 132, the present disclosure is not so limited. In embodiments, mobile cloud proxy device 102 may also be configured to provide cloud proxy service to stationary client device within mobile cloud proxy device's service area 132, e.g., when the mobile cloud proxy device's service area 132, due to the movement of mobile cloud proxy device 102, includes the location of the stationary client device. Additionally, in some embodiments, some mobile client devices 104 may be configured to always access cloud services through a mobile cloud proxy device with which it registered, otherwise, communication services 156 of mobile client devices 104 will not access cloud services.

Figure 3:
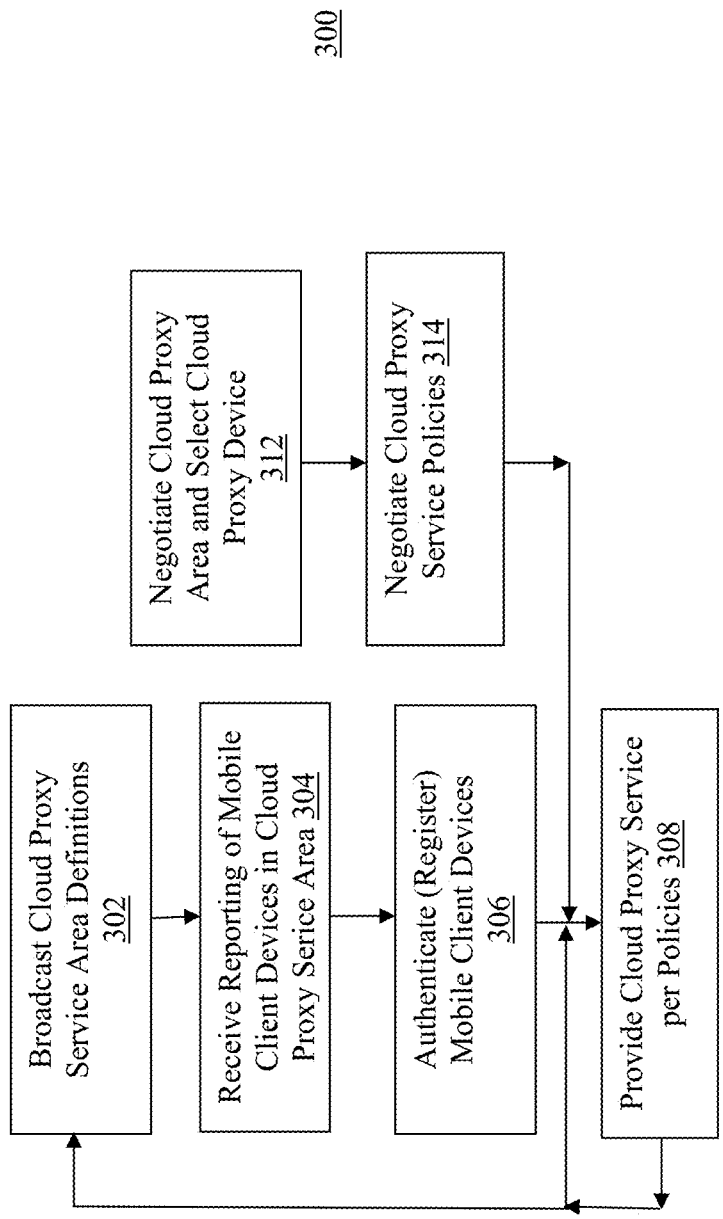
FIG. 3 is a flow diagram illustrating a process for providing mobile cloud proxy service, according to the disclosed embodiments.

Referring now to FIG. 3, wherein an example process for providing cloud proxy service, in accordance with various embodiments, is shown. As illustrated, in embodiments, process 300 for providing cloud proxy service may include operations performed at blocks 302-314 (some of which may be optional). The operations may be performed by, e.g., earlier described cloud proxy server 116, and/or geo-fencing server 118 of mobile cloud proxy device 102 of FIG. 1 to provide cloud proxy service to mobile client devices 104.

As shown, process 300 may start at block 302, or block 312.

At block 302, definitions of a cloud proxy service area may be broadcast. As described earlier, the size of the cloud proxy area may vary depending on a current location of the cloud proxy server. Next at block 304, reporting of presence of mobile client devices within the cloud proxy service area, in response to the broadcast, may be received. Then, at block 306, eligible new mobile client devices may be registered, and registered or previously serviced mobile client devices may be re-authenticated. Eligibility may be determined in any application dependent manner. For example, in one situation, only known family mobile client devices may be eligible for the mobile cloud proxy service; in another situation, only known co-worker mobile client devices may be eligible for the mobile cloud proxy service. Authentication may be performed using any one of a number of authentication techniques known in the art. On successful registration or authentication, from block 306, process 300 may proceed to block 308. At block 308, cloud proxy service may be provided. As described earlier, cloud proxy service may be provided in accordance with a number of proxy policies, such as storage, encryption, delay routing, filtering, and so forth. The operations of blocks 308 may be repeated for as long as necessary to provide the cloud proxy service to the mobile client devices, while the mobile client devices are within the cloud proxy service area. Periodically, process 300 may also return to block 302 and continue therefrom, to re-broadcast the cloud proxy area definitions to elicit responses, and enroll additional eligible mobile client devices to provide cloud proxy service.

Continuing to refer to FIG. 3, as noted earlier, process 300 may also start at block 312 instead. At block 312, instead of being broadcast, the definition of a cloud proxy service area and selection of a mobile cloud proxy device may be negotiated among a number of mobile client devices (as earlier described with reference to FIG. 2). Next, at block 314, operational policies, such as encryption, storage, and so forth, governing the provision of cloud proxy service may be negotiated among the mobile client/cloud proxy devices. On completion of the negotiations, process 300 may proceed to block 308, and proceed therefrom as earlier described.

Figure 4:
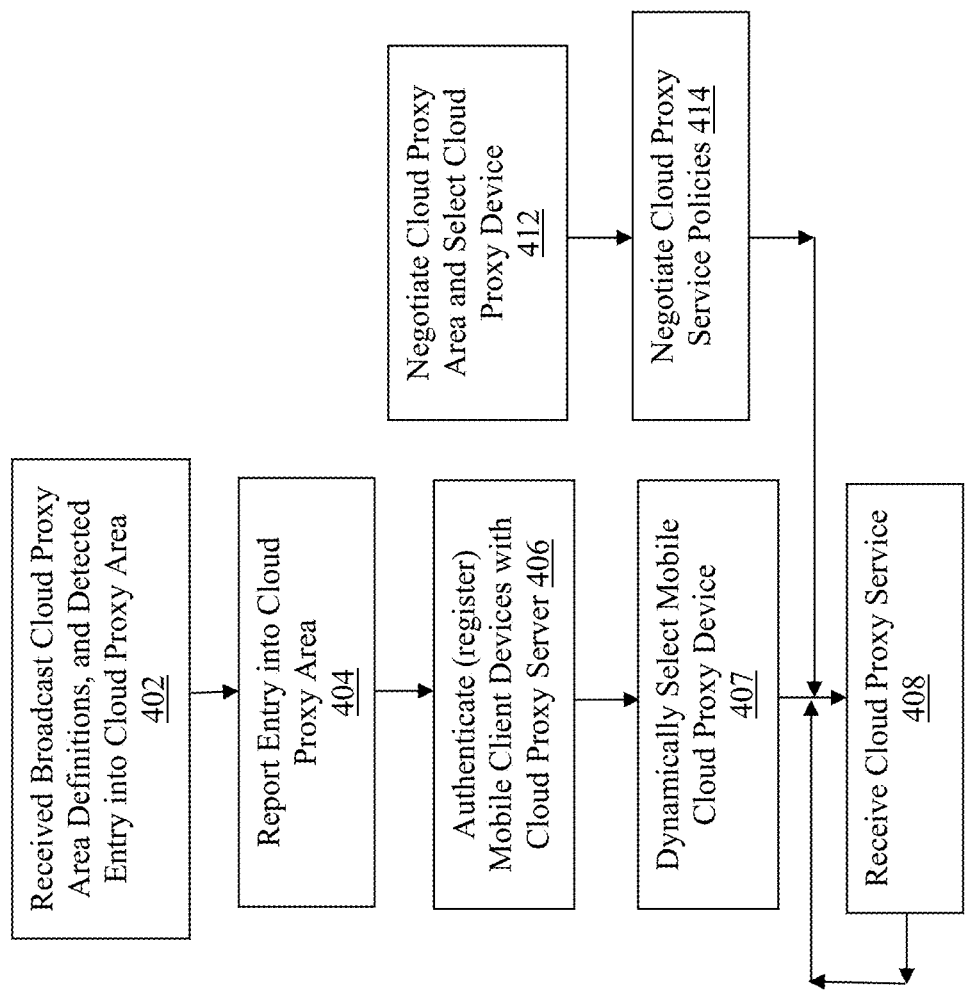
FIG. 4 is a flow diagram illustrating a process for using mobile cloud proxy service, according to the disclosed embodiments.

Referring now to FIG. 4, wherein an example process for using cloud proxy service, in accordance with various embodiments, is shown. As illustrated, in embodiments, process 400 for receiving cloud proxy service may include operations performed at blocks 402-414 (some of which may be optional). The operations may be performed by, e.g., dynamic proxy selection function 158 of mobile client device 104 of FIG. 1.

As shown, process 400 may start at block 402 or block 412.

At block 402, broadcast definitions of a cloud proxy service area may be received by a mobile client device. On receipt, a determination may be made to detect whether the recipient mobile client device is within the cloud proxy service area. Next at block 404, on determination that the recipient mobile client device is within the cloud proxy service area, presence of the recipient mobile client device within the cloud proxy service area may be reported to the broadcaster. Then, at block 406, the recipient may register itself with the broadcaster, or otherwise, re-authenticate itself with the broadcaster, if the recipient has previously registered or received cloud proxy service from the broadcaster.

From block 406, process 400 may proceed to block 407. At block 407, on successful registration or authentication of recipient mobile client device, the broadcaster may be selected to provide cloud proxy service to the recipient mobile client device. Next, at block 408, cloud proxy service may be used, i.e., recipient mobile client device may access various services in the cloud via the broadcaster mobile cloud proxy device. The operations at block 408 may be repeated a number of times, as long as necessary, to use the cloud proxy service to access services in the cloud.

Continuing to refer FIG. 4, as noted earlier, process 400 may also start at block 412 instead. At block 412, the definition of a cloud proxy service area and selection of a cloud proxy server may be negotiated among a number of potential service recipients. Next, at block 414, operational policies to govern the provision of cloud proxy service may be negotiated among the potential service providers and/or recipients. On completion of the negotiations, process 400 may proceed to block 408, and proceed therefrom as earlier described, with the selected device acting as the mobile cloud proxy device providing virtual sensor services to the other devices.

Figure 5:
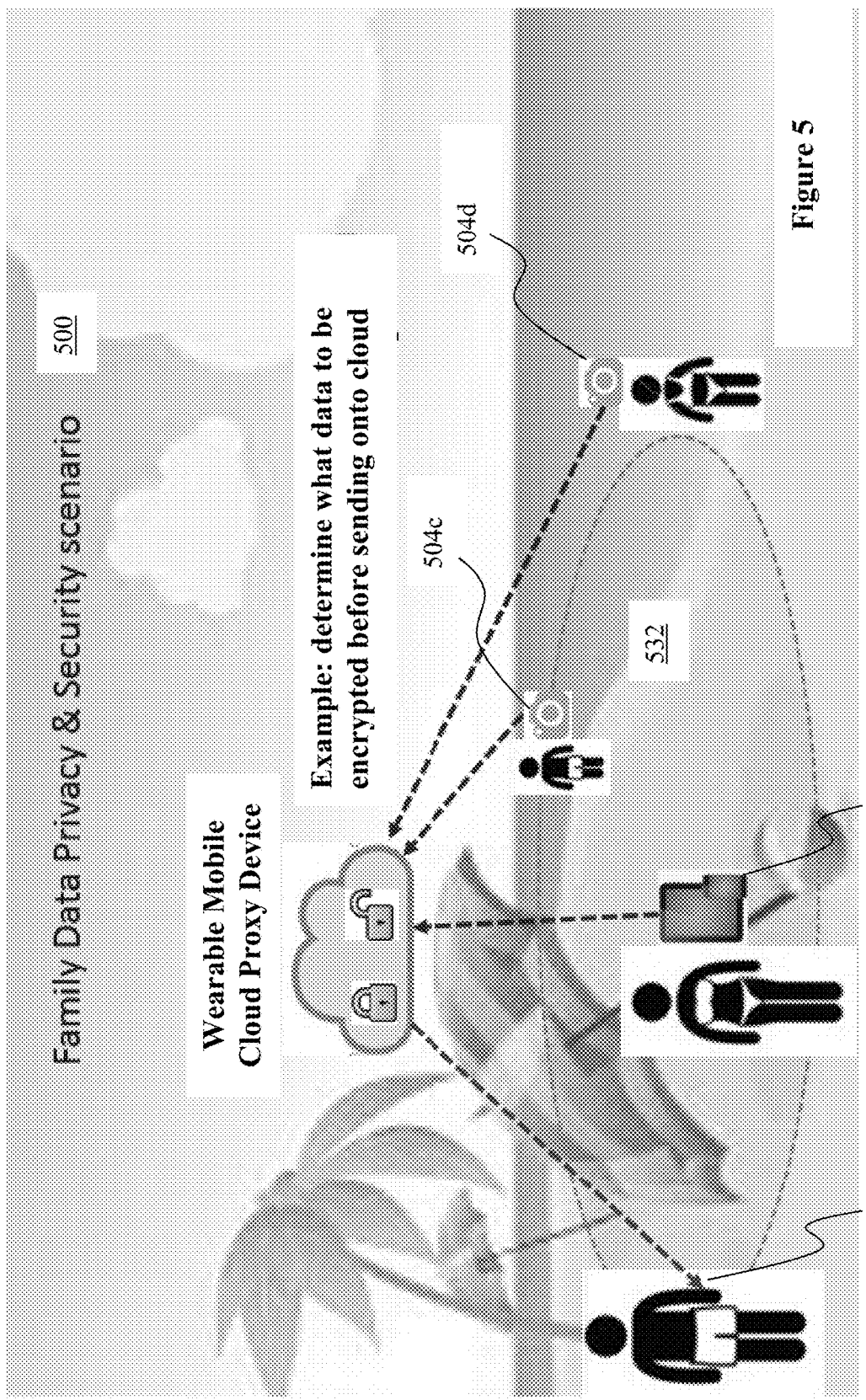
FIG. 5 illustrates an example mobile cloud proxy usage scenario, according to disclosed embodiments.

Referring now to FIG. 5, wherein an example mobile cloud proxy service usage scenario of the present disclosure, in accordance with various embodiments, is shown. As illustrated, a family data privacy security scenario 500 may include a family with father, mother and two children spending a day at the beach. The father may be adorned with a wearable mobile cloud proxy device 502 of the present disclosure, to provide cloud proxy service to mobile client devices 504a-504d of the mother, and the two children. Mobile client devices 504a-504b of the mother may include e.g., a computing tablet and a smartphone, whereas, mobile client devices 504c-504d may include e.g., various cameras. In embodiments, mobile cloud proxy device 502 may be configured to provide cloud proxy service to mobile client devices 504a-504d, while mobile client devices 504a-504d are within service area 532. In particular, mobile cloud proxy device 502 may be configured with a number of data storage and encryption policies, and provide the cloud proxy service in accordance with these data storage and encryption policies. For example, the data storage and encryption policies may include policies that govern where the photos taken by tablet 504a and smartphone 504b of the mother and cameras 504c-504d of the children are to be stored in the cloud, and whether the photos are to be encrypted before transmitted upstream to the cloud for storage.

Additionally, mobile cloud proxy device 502 may be configured with delay routing and/or filtering policies to govern delay routing and/or filtering of upstream or downstream data traffic to and from the cloud, e.g., when computing tablet 504a is used by the children instead. For example, one of the delay routing and/or filtering policies may allow the computing tablet 504a to display received instant messages, but delay transmission of any upstream instant messages, when the computing tablet 504a is used by the children.

Figure 6:
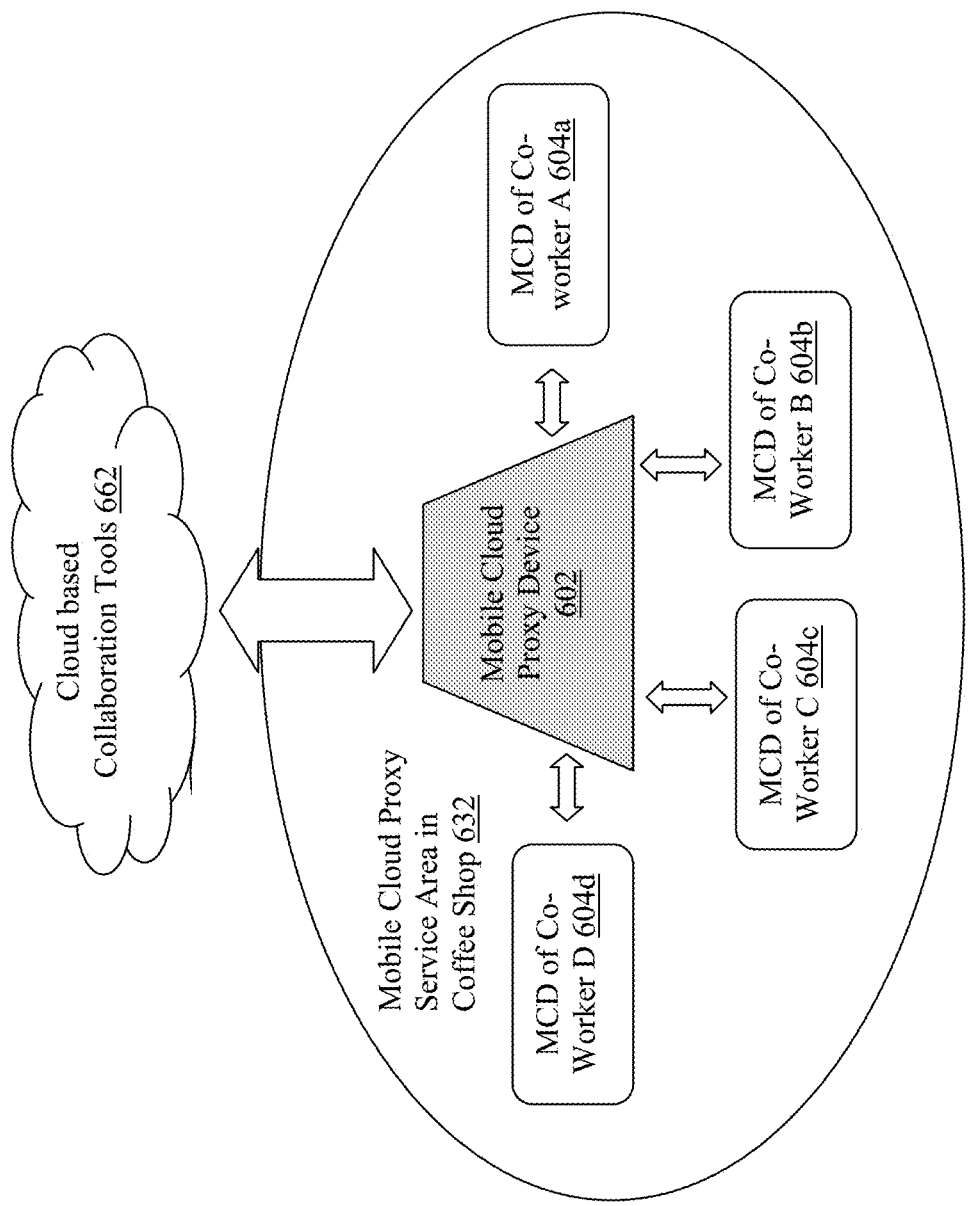
FIG. 6 illustrates another example mobile cloud proxy usage scenario, according to disclosed embodiments.

Referring now to FIG. 6, wherein another example usage scenario of the present disclosure, in accordance with various embodiments, is shown. As illustrated, a collaboration scenario 600 may include the employment of mobile cloud proxy device 602 to provide cloud proxy service to mobile client devices 604a-604d of various co-workers to use various cloud based collaboration tools 662, while mobile client devices 604a-604d are within a relatively small defined cloud proxy service area 632 in a coffee shop. As described earlier, the size of cloud proxy service area 632 is defined in view of the current location of mobile cloud proxy device 602, i.e. in a public place. Mobile cloud proxy device 602 may be configured to register and service only mobile client devices 604a-604d, after authentication. Mobile cloud proxy device 602 may also be configured with encryption policies that govern all upstream and downstream data traffic exchanges with collaboration tools 602 are to be encrypted.

Figure 7:
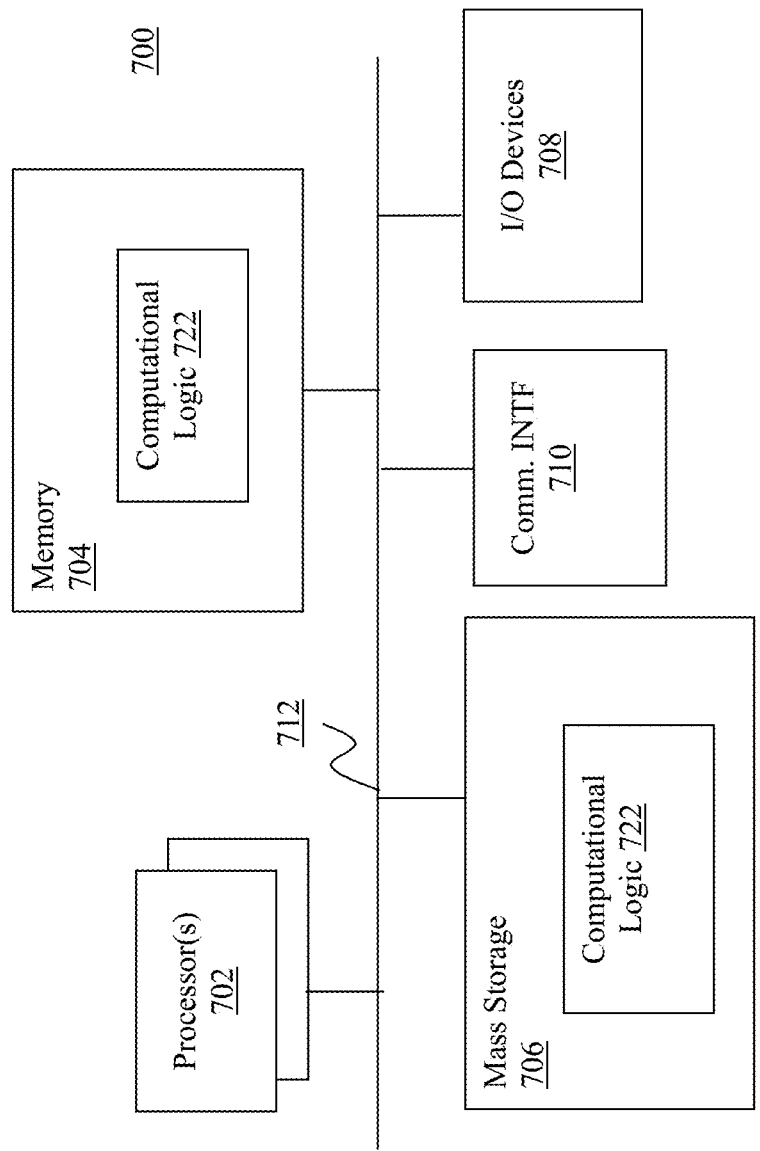
FIG. 7 illustrates an example computing system suitable for use to practice various aspects of the present disclosure, according to the disclosed embodiments.

FIG. 7 illustrates an example computing system that may be suitable for use as a mobile cloud proxy device or a mobile client device to practice selected aspects of the present disclosure. As shown, computing system 700 may include one or more processors or processor cores 702, and system memory 704. For the purpose of this application, including the claims, the terms "processor" and "processor cores" may be considered synonymous, unless the context clearly requires otherwise. Additionally, for some embodiments, computing system 700 may include mass storage devices 706 (such as, solid state storage), input/output devices 708 (such as display) and communication interfaces 710 (such as network interface cards, modems and so forth). The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage devices 706 may be employed to store a working copy and a permanent copy of the programming instructions implementing the operations associated with cloud proxy server 116, and/or dynamic proxy selection function 158 of FIG. 1, earlier described, collectively referred to as computational logic 722. The various elements may be implemented by assembler instructions supported by processor(s) 702 or high-level languages, such as, for example, C, that can be compiled into such instructions.

The number, capability and/or capacity of these elements 710-712 may vary, depending on whether computing system 700 is used as a mobile cloud proxy device or a client device, as well as whether the client device is stationary or mobile, e.g. whether computing system 700 is a wearable device, a smartphone, a computing tablet, an ultrabook or a laptop. Otherwise, the constitutions of elements 710-712 are known, and accordingly will not be further described.

Figure 8:
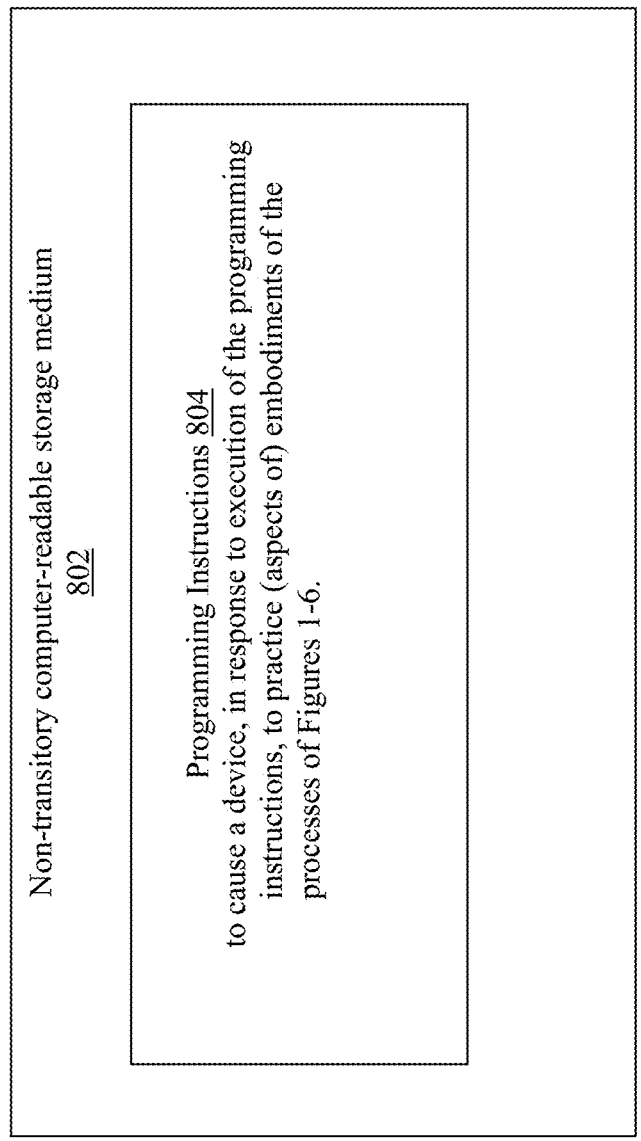
FIG. 8 illustrates a storage medium having instructions for practicing methods described with references to FIGS. 1-6, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 802 may include a number of programming instructions 804. Programming instructions 804 may be configured to enable a device, e.g., computing system 700, in response to execution of the programming instructions, to perform, e.g., various operations associated with cloud proxy server 116, and/or dynamic proxy selection function 158 of FIG. 1. In alternate embodiments, programming instructions 804 may be disposed on multiple computer-readable non-transitory storage media 802 instead. In alternate embodiments, programming instructions 804 may be disposed on computer-readable transitory storage media 802, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 7, for one embodiment, at least one of processors 702 may be packaged together with memory having computational logic 722 (in lieu of storing on memory 704 and storage 706). For one embodiment, at least one of processors 702 may be packaged together with memory having computational logic 722 to form a System in Package (SiP). For one embodiment, at least one of processors 702 may be integrated on the same die with memory having computational logic 722. For one embodiment, at least one of processors 702 may be packaged together with memory having computational logic 722 to form a System on Chip (SoC). For at least one embodiment, the SoC may be utilized in, e.g., but not limited to, a wearing computing device, a smartphone or computing tablet.

Thus various example embodiments of the present disclosure have been described including, but are not limited to:

Example 1 may be an apparatus for supporting computing of one or more mobile client devices. The apparatus may comprise: one or more processors; and a cloud proxy server. The cloud proxy server may be operated by the one or more processors, to provide cloud proxy service to the one or more mobile client devices while the one or more mobile client devices are within a mobile cloud proxy service area serviced by the cloud proxy server. The apparatus may be a mobile apparatus, and the cloud proxy server may include: a device and service area management module to manage the mobile cloud proxy service area and the one or more mobile client devices, and a policy and service management module to manage and provide the mobile cloud proxy service in accordance with one or more cloud proxy service policies.

Example 2 may be example 1, wherein the device and service area management module may broadcast or cause to be broadcast definitions of the mobile cloud proxy service area.

Example 3 may be example 2, further comprising a geo-fencing server, wherein the device and service area management module may cooperate with the geo-fencing server to broadcast definitions of the mobile cloud proxy service area.

Example 4 may be any one of examples 1-3, wherein the device and service area management module may detect presence of the one or more mobile client devices within the mobile cloud proxy service area, and on detection of the presence of the one or more mobile client devices within the mobile cloud proxy service area, may authenticate the one or more mobile client devices prior to provision of the cloud proxy service to the one or more mobile client devices.

Example 5 may be any one of examples 1-4, wherein the device and service area management module may register the one or more mobile client devices with the apparatus.

Example 6 may be any one of examples 1-5, further comprising a communication services module to be operated by the one or more processors; wherein the policy and service management module may cooperate with the communication services module to provide the cloud proxy service.

Example 7 may be any one of examples 1-6, wherein the policy and service management module may manage, provide or cause to be provided the cloud proxy service that includes conditional encryption of data transmitted upstream from the one or more mobile client devices, in accordance with an encryption policy.

Example 8 may be any one of examples 1-7, wherein the policy and service management module is to manage, provide or cause to be provided the cloud proxy service that includes conditional delay or reroute of data transmitted upstream from the one or more mobile client devices, in accordance with a transmission policy.

Example 9 may be any one of examples 1-8, wherein the policy and service management module is to manage, provide or cause to be provided the cloud proxy service that includes conditional filter or delay of data transmitted downstream to the one or more mobile client devices, in accordance with a transmission policy.

Example 10 may be any one of examples 1-9, wherein the one or more mobile client devices comprise a plurality of mobile client devices; wherein the apparatus is one of the plurality of mobile client devices and at least one of the other mobile client devices also comprises a cloud proxy server; and wherein the cloud proxy server of the apparatus may negotiate with the cloud proxy server(s) of the at least one of the other mobile client devices, with respect to which cloud proxy server, among the plurality cloud proxy servers, is to provide the cloud proxy service for the plurality of mobile client devices.

Example 11 may be any one of examples 1-10, wherein the apparatus is a wearable device.

Example 12 may be a mobile client device for computing. The mobile client device may comprise one or more processors; and a dynamic proxy selection service. The dynamic proxy selection service may be operated by the one or more processors, to select a mobile cloud proxy device to provide cloud proxy service to the mobile client device, in response to a determination that the mobile client device is within a mobile cloud proxy service area serviced by the mobile cloud proxy device.

Example 13 may be example 12, wherein the dynamic proxy selection module may determine or be informed of a determination that the mobile client device is within the mobile cloud proxy service area serviced by the mobile cloud proxy device.

Example 14 may be example 13, further comprising a geo-fencing function to be operated by the one or more processors; wherein the dynamic proxy selection module may be informed of the determination that the mobile client device is within the mobile cloud proxy service area serviced by the mobile cloud proxy device, by the geo-fencing function.

Example 15 may be any one of examples 12-14, wherein on selection of the mobile cloud proxy device to provide cloud proxy service to the mobile client device, the dynamic proxy selection module may establish and maintain a temporal proxy relationship with a cloud proxy server of the cloud proxy device, while the mobile client device is within the mobile cloud proxy service area.

Example 16 may be any one of examples 12-15, further comprising a communication service module to be operated by the one or more processors to provide communication services for the mobile client device, wherein the communication service module may include the dynamic proxy selection module.

Example 17 may be any one of examples 12-16, wherein the mobile client device is a first mobile client device, and the mobile cloud proxy device is a first mobile cloud proxy device; wherein the first mobile client device is also a second mobile cloud proxy device, and the first mobile cloud proxy device is also a second mobile client device; wherein the first and second mobile client/cloud proxy devices may negotiate, with respect to which device is serve as a mobile cloud proxy device, to provide the cloud proxy service for the both mobile client devices.

Example 18 may be example 17, wherein the mobile client device may be a wearable device.

Example 19 may be a method for supporting computing of one or more mobile client devices. The method may comprise: detecting, by a cloud proxy server of a mobile cloud proxy device, presence of the one or more mobile client devices within a mobile cloud proxy service area serviced by the mobile cloud proxy device; on detection of the presence, authenticating, by the cloud proxy server, the one or more mobile client devices; and on authentication, providing, by the cloud proxy server, cloud proxy service for the one or more mobile client devices.

Example 20 may be example 19, further comprising broadcasting, by the cloud proxy server, definitions of the mobile cloud proxy service area.

Example 21 may be example 20, wherein broadcasting may comprise a device and service area management module of the cloud proxy server cooperating with a geo-fencing server of the cloud proxy server to broadcast the definitions of the mobile cloud proxy service area.

Example 22 may be example 21, wherein detecting may comprise detecting, by the device and service area management module, presence of the one or more mobile client devices within the mobile cloud proxy service area, and authenticating comprises authenticating, by the device and service area management module, the one or more mobile client devices prior to provision of the cloud proxy service to the one or more mobile client devices.

Example 23 may be any one of examples 19-22, further comprising registering, by the cloud proxy server, the one or more mobile client devices.

Example 24 may be any one of examples 19-23, wherein providing may comprise governing the providing of cloud proxy service, by the cloud proxy server, with one or more policies.

Example 25 may be example 24, wherein governing may comprise governing the providing of cloud proxy service, by the cloud proxy server, in accordance with an encryption policy that specifies conditional encryption of data transmitted upstream from the one or more mobile client devices.

Example 26 may be example 24, wherein governing may comprise governing the providing of cloud proxy service, by the cloud proxy server, in accordance with a transmission policy that specifies conditional delay or reroute of data transmitted upstream from the one or more mobile client devices.

Example 27 may be example 24, wherein governing may comprise governing the providing of cloud proxy service, by the cloud proxy server, in accordance with a transmission policy that specifies conditional filter or delay of data transmitted downstream to the one or more mobile client devices.

Example 28 may be a method for mobile computing. The method may comprise: detecting, by a mobile client device, presence of the mobile client device within a mobile proxy service area serviced by a mobile cloud proxy device; on detection of the presence, authenticating the mobile client device with the mobile cloud proxy device, by the mobile client device; and on authentication, receiving, by the mobile client device, cloud proxy service from the mobile cloud proxy device.

Example 29 may be example 28, wherein detecting may comprise determining, by a geo-fencing function of the mobile client device, that the mobile client device is within the mobile cloud proxy service area serviced by the mobile cloud proxy device.

Example 30 may be example 28 or 29, wherein detecting may comprise determining, by a dynamic proxy selection module of the mobile client device, that the mobile client device is within the mobile cloud proxy service area serviced by the mobile cloud proxy device.

Example 31 may example 30, further comprising selecting, by the dynamic proxy selection module, the mobile cloud proxy device to provide cloud proxy service to the mobile client device; and establishing and maintaining, by the dynamic proxy selection module, a temporal proxy relationship with a cloud proxy server of the mobile cloud proxy device, while the mobile client device is within the mobile cloud proxy service area.

Example 32 may be one more computer-readable medium (CRM) having stored therein a plurality of instructions to cause a mobile cloud proxy device, in response to execution of the instructions by the mobile cloud proxy device to provide cloud proxy service to one or more mobile client devices within a mobile cloud proxy service area serviced by the mobile cloud proxy device, wherein the instructions, on execution, provide the mobile cloud proxy device with a cloud proxy server to: detect for presence of the one or more mobile client devices within the mobile cloud proxy service area; on detection of the presence, authenticate the one or more mobile client devices; and on authentication, provide cloud proxy service for the one or more mobile client devices.

Example 33 may be example 32, wherein the cloud proxy server may comprise a device and service area management module to broadcast or cause to be broadcast definitions of the mobile cloud proxy service area.

Example 34 may be example 33, wherein the device and service area management module may cooperate with a geo-fencing server of the mobile cloud proxy device to broadcast definitions of the mobile cloud proxy service area.

Example 35 may be example 33, wherein the device and service area management module may detect presence of the one or more mobile client devices within the mobile cloud proxy service area, and on detection of the presence of the one or more mobile client devices within the mobile cloud proxy service area, may authenticate the one or more mobile client devices prior to provision of the cloud proxy service to the one or more mobile client devices.

Example 36 may be example 33, wherein the device and service area management module may register the one or more mobile client devices with the apparatus.

Example 37 may be any one of examples 32-36, wherein the cloud proxy server may comprise a policy and service management module to cooperate with a communication services module of the mobile cloud proxy device to provide the cloud proxy service.

Example 38 may be any one of examples 32-36, wherein the cloud proxy server may comprise a policy and service management module to manage, provide or cause to be provided the cloud proxy service that includes conditional encryption of data transmitted upstream from the one or more mobile client devices, in accordance with an encryption policy.

Example 39 may be any one of examples 32-36, wherein the cloud proxy server my comprise a the policy and service management module is to manage, provide or cause to be provided the cloud proxy service that includes conditional delay or reroute of data transmitted upstream from the one or more mobile client devices, in accordance with a transmission policy.

Example 40 may be any one of examples 32-36, wherein the cloud proxy server may comprise a policy and service management module is to manage, provide or cause to be provided the cloud proxy service that includes conditional filter or delay of data transmitted downstream to the one or more mobile client devices, in accordance with a transmission policy.

Example 41 may be one more computer-readable medium (CRM) having stored therein a plurality of instructions to cause a mobile client device, in response to execution of the instructions by the mobile client device to receive cloud proxy service from a mobile cloud proxy device, when the mobile client device is within a mobile cloud proxy service area serviced by the mobile cloud proxy device, wherein the instructions, on execution, provide the mobile client device with a dynamic proxy selection module to: detect for presence of the one or more mobile client devices within the mobile cloud proxy service area; on detection of the presence, authenticate the mobile client device with the mobile cloud proxy device; and on authentication, receiving, cloud proxy service from the mobile cloud proxy device.

Example 42 may be example 41, wherein the dynamic proxy selection module may determine or be informed of a determination that the mobile client device is within the mobile cloud proxy service area serviced by the mobile cloud proxy device.

Example 43 may be example 42, wherein the dynamic proxy selection module may be informed of the determination that the mobile client device is within the mobile cloud proxy service area serviced by the mobile cloud proxy device, by a geo-fencing function of the mobile client device.

Example 44 may be any one of examples 41-43, wherein on selection of the mobile cloud proxy device to provide cloud proxy service to the mobile client device, the dynamic proxy selection module is to establish and maintain a temporal proxy relationship with a cloud proxy server of the cloud proxy device, while the mobile client device is within the mobile cloud proxy service area.

Example 45 may be any one of examples 41-44, wherein the dynamic proxy selection module may be part of a communication service module of the mobile client device.

Example 46 may be an apparatus for supporting computing of one or more mobile computing devices. The apparatus may comprise: one or more processors; and means for providing cloud proxy service to the one or more mobile client devices while the one or more mobile client devices are within a mobile cloud proxy service area serviced by the cloud proxy server. The apparatus may be a mobile apparatus, and the means for providing cloud proxy service may include: means for managing the mobile cloud proxy service area and the one or more mobile client devices, and means for providing the mobile cloud proxy service in accordance with one or more cloud proxy service policies.

Example 47 may be example 46, wherein means for managing the mobile cloud proxy service area and the one or more mobile client devices may comprise means for broadcasting definitions of the mobile cloud proxy service area.

Example 48 may be example 47, wherein means for broadcasting may comprise means for cooperating with a geo-fencing server of the cloud proxy server to broadcast the definitions of the mobile cloud proxy service area.

Example 49 may be any one of examples 46-48, wherein means for managing may comprise means for detecting presence of the one or more mobile client devices within the mobile cloud proxy service area, and means for authenticating the one or more mobile client devices prior to provision of the cloud proxy service to the one or more mobile client devices.

Example 50 may be any one of examples 46-49, wherein means for managing may comprise means for registering the one or more mobile client devices with the apparatus.

Example 51 may be any one of examples 46-50, wherein means for providing may comprise means for governing the providing of cloud proxy service with one or more policies.

Example 52 may be example 51, wherein means for governing may comprise means for governing the providing of cloud proxy service, by the cloud proxy server, in accordance with an encryption policy that specifies conditional encryption of data transmitted upstream from the one or more mobile client devices.

Example 53 may be example 51 or 52, wherein means for governing may comprise means for governing the providing of cloud proxy service, by the cloud proxy server, in accordance with a transmission policy that specifies conditional delay or reroute of data transmitted upstream from one or more mobile client devices.

Example 54 may be example 51, 52 or 53, wherein means for governing may comprise means for governing the providing of cloud proxy service, by the cloud proxy server, in accordance with a transmission policy that specifies conditional filter or delay of data transmitted downstream to the one or more mobile client devices.

Example 55 may be a mobile client device for computing. The mobile client device may comprise: one or more processors; and means for dynamically selecting a mobile could proxy device to provide a cloud proxy service to the mobile client device, in response to a determination that the mobile client device is within a mobile cloud proxy service area serviced by the mobile cloud proxy device.

Example 56 may be example 55, wherein means for dynamically selecting may comprise means for receiving a result of a determination by a geo-fencing function of the mobile client device, that the mobile client device is within the mobile cloud proxy service area serviced by the mobile cloud proxy device.

Example 57 may be example 55, wherein means for dynamically selecting comprises means for determining that the mobile client device is within the mobile cloud proxy service area serviced by the mobile cloud proxy device.

Example 58 may be example 56 or 57, wherein means for dynamically selecting comprises means for selecting the mobile cloud proxy device to provide cloud proxy service to the mobile client device; and means for establishing and maintaining a temporal proxy relationship with a cloud proxy server of the mobile cloud proxy device, while the mobile client device is within the mobile cloud proxy service area.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A wearable apparatus for supporting computing of one or more mobile client devices external to the wearable apparatus, comprising:
   one or more processors; and
   a cloud proxy server to be operated by the one or more processors, to provide cloud proxy service to the one or more external mobile client devices while the one or more external mobile client devices are within a mobile cloud proxy service area of the wearable apparatus serviced by the cloud proxy server;

wherein the cloud proxy server includes:
a device and service area management module to manage the mobile cloud proxy service area of the wearable apparatus and the one or more external mobile client devices, and
a policy and service management module to manage and provide the mobile cloud proxy service in accordance with one or more cloud proxy service policies;
wherein the wearable apparatus is to be worn by a user; and
wherein the one or more external mobile client devices are one or more smartphones, cameras, computing tablets, ultrabooks, ebooks, laptops, or portable gaming devices.

2. The wearable apparatus of claim 1, wherein the device and service area management module is to broadcast or cause to be broadcast definitions of the mobile cloud proxy service area of the wearable apparatus for the one or more external mobile client devices.

3. The wearable apparatus of claim 2, further comprising a geo-fencing server, wherein the device and service area management module is to cooperate with the geo-fencing server to broadcast definitions of the mobile cloud proxy service area of the wearable apparatus for the one or more external mobile client devices.

4. The wearable apparatus of claim 1, wherein the device and service area management module is to detect presence of the one or more external mobile client devices within the mobile cloud proxy service area of the wearable apparatus, and on detection of the presence of the one or more external mobile client devices within the mobile cloud proxy service area, authenticate the one or more external mobile client devices prior to provision of the cloud proxy service to the one or more external mobile client devices.

5. The wearable apparatus of claim 1, wherein the device and service area management module is to register the one or more external mobile client devices with the wearable apparatus.

6. The wearable apparatus of claim 1, further comprising a communication services module to be operated by the one or more processors;
wherein the policy and service management module is to cooperate with the communication services module to provide the cloud proxy service.

7. The wearable apparatus of claim 1, wherein the policy and service management module is to manage, provide or cause to be provided the cloud proxy service that includes conditional encryption of data transmitted upstream from the one or more external mobile client devices, in accordance with an encryption policy.

8. The wearable apparatus of claim 1, wherein the policy and service management module is to manage, provide or cause to be provided the cloud proxy service that includes conditional delay or reroute of data transmitted upstream from the one or more external mobile client devices, in accordance with a transmission policy.

9. The wearable apparatus of claim 1, wherein the policy and service management module is to manage, provide or cause to be provided the cloud proxy service that includes conditional filter or delay of data transmitted downstream to the one or more external mobile client devices, in accordance with a transmission policy.

10. The wearable apparatus of claim 1, wherein the one or more external mobile client devices comprise a plurality of external mobile client devices;
wherein the wearable apparatus is one of the plurality of external mobile client devices and at least one of the other external mobile client devices also comprises a cloud proxy server;
and wherein the cloud proxy server of the wearable apparatus is to negotiate with the cloud proxy server(s) of the at least one of the other external mobile client devices, with respect to which cloud proxy server, among a plurality of cloud proxy servers, is to provide the cloud proxy service for the other plurality of external mobile client devices.

11. The wearable apparatus of claim 1, wherein the wearable apparatus is a selected one of a wrist band, a waist band, or a head band.

12. A mobile client device for computing, comprising:
one or more processors; and
a dynamic proxy selection service to be operated by the one or more processors, to select an external wearable cloud proxy device, worn by a user, to provide cloud proxy service to the mobile client device, in response to a determination that the mobile client device is within a mobile cloud proxy service area serviced by the external wearable cloud proxy device;
wherein the external wearable cloud proxy device includes a cloud proxy server having:
a device and service area management module to manage the mobile cloud proxy service area of the mobile external wearable cloud proxy device, and
a policy and service management module to manage and provide the mobile cloud proxy service in accordance with one or more cloud proxy service policies;
wherein the mobile client device is a selected one of a smartphone, a camera, a computing tablet, an ultrabook, an ebook, a laptop, or a portable gaming device.

13. The mobile client device of claim 12, wherein a dynamic proxy selection module is to determine or be informed of a determination that the mobile client device is within the mobile cloud proxy service area serviced by the external wearable cloud proxy device.

14. The mobile client device of claim 13, further comprising a geo-fencing function to be operated by the one or more processors; wherein the dynamic proxy selection module is to be informed of the determination that the mobile client device is within the mobile cloud proxy service area serviced by the external wearable cloud proxy device, by the geo-fencing function.

15. The mobile client device of claim 12, wherein on selection of the external wearable cloud proxy device to provide cloud proxy service to the mobile client device, the dynamic proxy selection module is to establish and maintain a temporal proxy relationship with a cloud proxy server of the external wearable cloud proxy device, while the mobile client device is within the mobile cloud proxy service area of the external-wearable cloud proxy device.

16. The mobile client device of claim 12, further comprising a communication service module to be operated by the one or more processors to provide communication services for the mobile client device, wherein the communication service module includes a dynamic proxy selection module.

17. The mobile client device of claim 12, wherein the mobile client device is a wearable device.

18. A method for supporting computing of one or more mobile client devices, comprising:

broadcasting, by a cloud proxy server of a wearable cloud proxy device, definitions of a mobile cloud proxy service area serviced by the wearable cloud proxy device;

detecting, by the cloud proxy server, selections of the wearable cloud proxy device by one or more external mobile client devices present within the mobile cloud proxy service area of the wearable cloud proxy device, to provide cloud proxy services to the one or more external mobile client devices;

on detection of the selections, authenticating, by the cloud proxy server, the one or more external present mobile client devices; and on authentication, providing, by the cloud proxy server, cloud proxy services for the one or more external mobile client devices, in accordance with one or more proxy service policies;

wherein the one or more external mobile client devices are one or more smartphones, cameras, computing tablets, ultrabooks, ebooks, laptops, or portable gaming devices.

19. The method of claim 18, wherein providing cloud proxy services in accordance with one or more proxy service policies comprises providing cloud proxy services, by the cloud proxy server, in accordance with one or more proxy service policies, including:

an encryption policy that specifies conditional encryption of data transmitted upstream from the one or more external present mobile client devices, a transmission policy that specifies conditional delay or reroute of data transmitted upstream from the one or more external present mobile client devices, or a transmission policy that specifies conditional filter or delay of data transmitted downstream to the one or more external present mobile client devices.

20. One more non-transitory computer-readable medium (CRM) having stored therein a plurality of instructions to cause a wearable cloud proxy device, worn by a user, in response to execution of the instructions by the wearable cloud proxy device to provide cloud proxy service to one or more external mobile client devices within a mobile cloud proxy service area serviced by the wearable cloud proxy device, wherein the instructions, on execution, provide the wearable cloud proxy device with a cloud proxy server to:

broadcast definitions of a mobile cloud proxy service area serviced by the wearable cloud proxy device;

detect for selections of the wearable cloud proxy device by one or more mobile client devices present within the mobile cloud proxy service area of the wearable cloud proxy device to provide cloud proxy services to the one or more external mobile client devices;

on detection of the selections, authenticate the one or more external mobile client devices; and on authentication, provide cloud proxy service for the one or more external mobile client devices, in accordance with one or more proxy service policies;

wherein the one or more external mobile client devices are one or more smartphones, cameras, computing tablets, ultrabooks, ebooks, laptops, or portable gaming devices.

21. The CRM of claim 20, wherein the one or more proxy service policies include an encryption policy of conditional encryption of data transmitted upstream from the one or more external mobile client devices.

22. The CRM of claim 20, wherein the one or more proxy service policies include a transmission policy of conditional delay or reroute of data transmitted upstream from the one or more external mobile client devices.

23. The CRM of claim 20, wherein the one or more proxy service policies include a transmission policy of conditional filter or delay of data transmitted downstream to the one or more external mobile client devices.

* * * * *